US009503953B1

United States Patent
Oroskar et al.

(10) Patent No.: US 9,503,953 B1
(45) Date of Patent: Nov. 22, 2016

(54) INCREASING REFERENCE SIGNAL LEVEL TO PREVENT COMMUNICATION FORMAT CHANGE

(71) Applicant: Sprint Communications Company L.P., Overland Park, KS (US)

(72) Inventors: Siddharth Oroskar, Overland Park, KS (US); Maulik K. Shah, Overland Park, KS (US); Anoop Kumar Goyal, Overland Park, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 841 days.

(21) Appl. No.: 13/866,125

(22) Filed: Apr. 19, 2013

(51) Int. Cl.
*H04L 25/49* (2006.01)
*H04W 36/30* (2009.01)

(52) U.S. Cl.
CPC .................................. *H04W 36/30* (2013.01)

(58) Field of Classification Search
CPC ... H04W 80/04; H04W 36/18; H04W 36/14; H04W 36/08
See application file for complete search history.

(56) References Cited

U.S. PATENT DOCUMENTS

| | | | |
|---|---|---|---|
| 2008/0002626 A1* | 1/2008 | Yokoyama | H04W 52/346 370/331 |
| 2009/0207896 A1* | 8/2009 | Behzad | H04B 1/0475 375/221 |
| 2010/0278150 A1* | 11/2010 | Park | H04W 36/0016 370/332 |
| 2011/0189997 A1 | 8/2011 | Tiwari et al. | |
| 2011/0255516 A1 | 10/2011 | Pawar et al. | |
| 2012/0170547 A1 | 7/2012 | Oprescu-Surcobe et al. | |
| 2013/0111235 A1* | 5/2013 | Yang | G06F 1/266 713/310 |

* cited by examiner

*Primary Examiner* — Andrew Lai
*Assistant Examiner* — Zhiren Qin (57) ABSTRACT

Embodiments disclosed herein provide systems, methods, and software for increasing reference signal power to prevent communication format change. In a particular embodiment, a method of operating a wireless communication system includes identifying a wireless communication device with first communication format to second communication format switching capability. The method further provides allocating a center bandwidth in the first communication format for the wireless communication device. The method further provides identifying a handover event from the wireless communication device requesting a switch from the first communication format to the second communication format and increasing the reference signal power for at least the center bandwidth in the first communication format.

20 Claims, 8 Drawing Sheets

INCREASING REFERENCE SIGNAL LEVEL TO PREVENT COMMUNICATION FORMAT CHANGE

TECHNICAL BACKGROUND

Many modern wireless communication devices are capable of switching from a faster data connection, such as LTE, to a slower connection, such as EVDO. These switches occur seamlessly when a user moves from a location with the faster data connection to a location with the slower data connection. For example, if a user makes a data connection while in an LTE coverage zone, the data connection will seamlessly switch to the slower connection when the user leaves the LTE zone.

The switch to the slower connection is efficient for users. However, there are currently no methods to seamlessly switch back to the faster data connection when the user approaches another faster connection zone. Thus, in situations where two faster connection zones are close, but not connected, the user may continue on the slower connection despite being in a faster connection zone.

Overview

Embodiments disclosed herein provide systems, methods, and software for increasing reference signal power to prevent communication format change. In a particular embodiment, a method of operating a wireless communication system includes identifying a wireless communication device with first communication format to second communication format switching capability. The method further provides allocating a center bandwidth in the first communication format for the wireless communication device. The method further provides identifying a handover event from the wireless communication device requesting a switch from the first communication format to the second communication format, and increasing the reference signal power for at least the center bandwidth in the first communication format.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
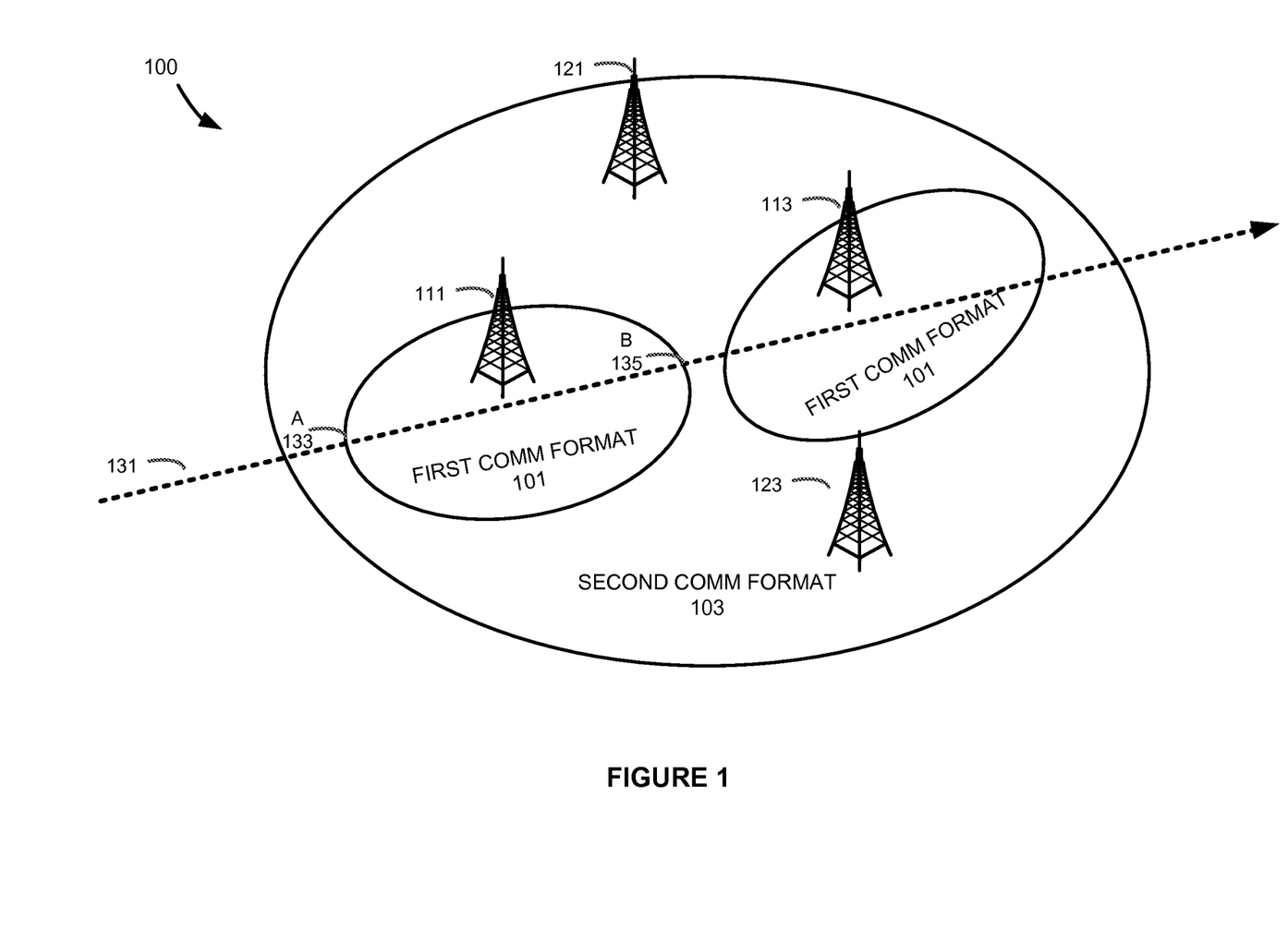
FIG. 1 illustrates a wireless communication system.

FIG. 1 illustrates a wireless communication system 100 according to one example. Wireless communication system 100 includes base stations 111, 113, 121, 123, and wireless device path 131. Base station 111 and base station 113 provide first communication format 101, and base station 121 and base station 123 provide second communication format 103.

In operation, a wireless device may traverse wireless device path 131. During this traversal, the wireless device may communicate with other wireless devices, application service systems, the Internet, and other types of communication systems using first communication format 101 and/or second communication format 103. In some examples, the wireless device may be capable of seamlessly switching during a data connection from first communication format 101 to second communication format 103 when the wireless device leaves the first communication format coverage area. However, the wireless device may not be able to seamlessly switch from second communication format 103 back to first communication format 101.

Figure 2:
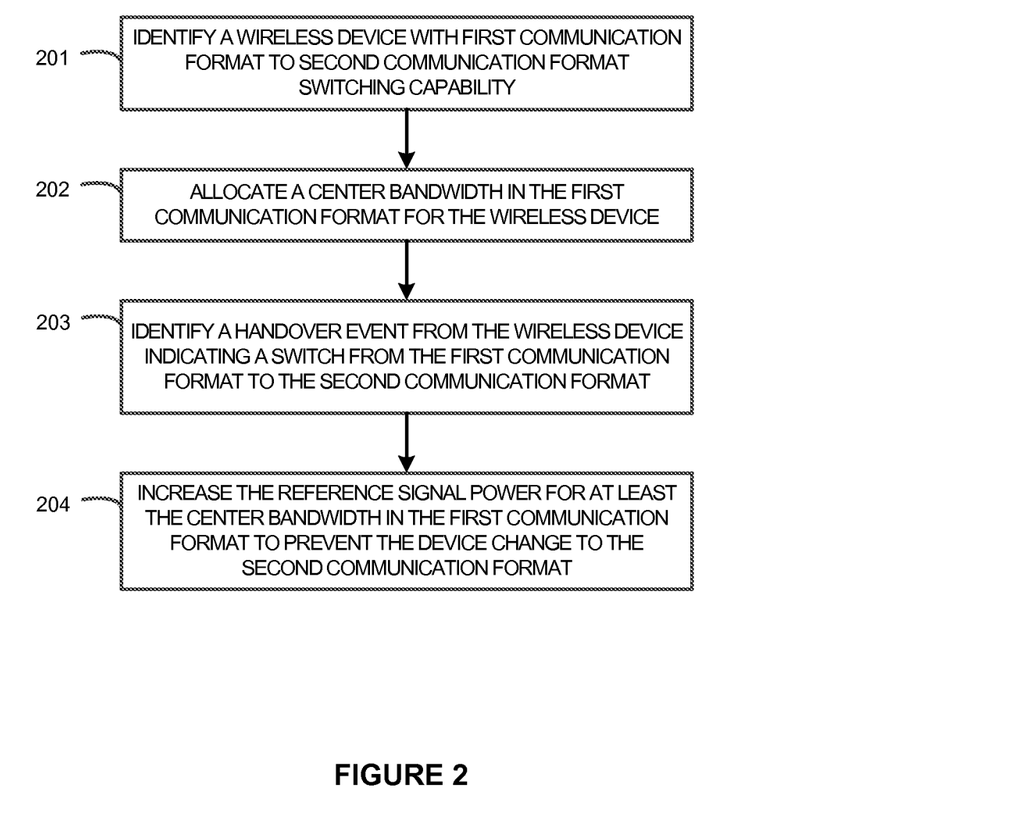
FIG. 2 illustrates a method for operating a wireless communication system.

FIG. 2 illustrates a method of operating wireless communication system 100 according to one example. The method begins by identifying a wireless device with first communication format 101 to second communication format 103 switching capability (step 201). This identification may occur when the wireless device first enters first communication format 101 (depicted by point A 133), or may occur when the wireless device initiates a data connection in first communication format 101. In some examples, first communication format 101 may be a communication format such as Long Term Evaluation (LTE) or some other similar format, and second communication format 103 may be a slower communication format than first communication format 101, such as Evolution Data Only (EVDO) or some other slower communication format.

In a particular example, the method provides for identifying only devices that are traversing a specific path, such as wireless device path 131. Wireless device path 131 may be a highway, a train line, or some other typical route for a wireless device. In an alternative example, system 100 may identify any wireless device in the first communication format coverage area that has first communication format 101 to second communication format 103 switching capability.

Following the identification of a wireless communication device, a center bandwidth will be allocated in first communication format 101 for the identified device (step 202). In at least one example, the center bandwidth will be the center three megahertz of a five or ten megahertz bandwidth.

As the device travels along wireless device path 131 or some other path within communication system 100, the device may reach a boundary of first communication format 101. As illustrated in FIG. 1, if the device were to travel along wireless device path 131 the boundary would be at point B 135 on wireless device path 131. Upon reaching the boundary, system 100 may identify a handover event from the wireless device indicating a switch from first communication format 101 to second communication format 103 (step 203). In response to the handover event, system 100 will increase the reference signal level, in at least the center bandwidth, for the first communication format to prevent the wireless device change to the second communication format (step 204). In some examples, the reference signal level will only increase for the center bandwidth that was identified in step 202, but the remaining bandwidth may stay the same or decrease. In other examples, the reference signal level will increase for the entire bandwidth of first communication format 101.

Referring back to FIG. 1, base stations 111, 113, 121, and 123 comprise RF communication circuitry and an antenna. The RF communication circuitry typically includes an amplifier, filter, RF modulator, and signal processing circuitry. Base stations 111, 113, 121, and 123 may also comprise a router, server, memory device, software, processing circuitry, cabling, power supply, network communication interface, structural support, or some other communication apparatus.

In operation, base stations 111, 113, 121, and 123 are used to provide wireless communications to wireless devices. Such wireless communications, in the present example, include first communication format 101 for base stations 111 and 113, and second communication format 103 for base stations 121 and 123. First communication format 101 and second communication format 103 may include Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. In FIG. 1, first communication format 101 is a faster communication format than second communication format 103. In a specific example, first communication format 101 comprises LTE format and second communication format 103 comprises EVDO format. In some examples, base stations 111 and 113 may comprise eNodeBs if first communication format 101 is an LTE format.

Wireless device path 131 comprises a highway, train, or some other busy thoroughfare for wireless communication devices. In some examples, a network administrator may identify the thoroughfare prior to implementing the method in FIG. 2. In other examples, the system may be configured to determine the thoroughfare based on the transition of devices between base station 111 and base station 113.

The wireless communication devices that use communication system 100 each comprise Radio Frequency (RF) communication circuitry and an antenna. The RF communication circuitry typically includes an amplifier, filter, modulator, and signal processing circuitry. Wireless communication devices may also include a user interface, memory device, software, processing circuitry, or some other communication components. Each of the wireless communication devices may be a telephone, computer, e-book, mobile Internet appliance, wireless network interface card, media player, game console, or some other wireless communication apparatus—including combinations thereof.

Although not illustrated for simplicity, a reference signal power system may be connected to base stations 111 and 113. The reference signal power system may be used to accomplish the method described in FIG. 2 as well as other possible operations. An implementation of reference signal power system is described below in FIG. 4.

Figure 3A:
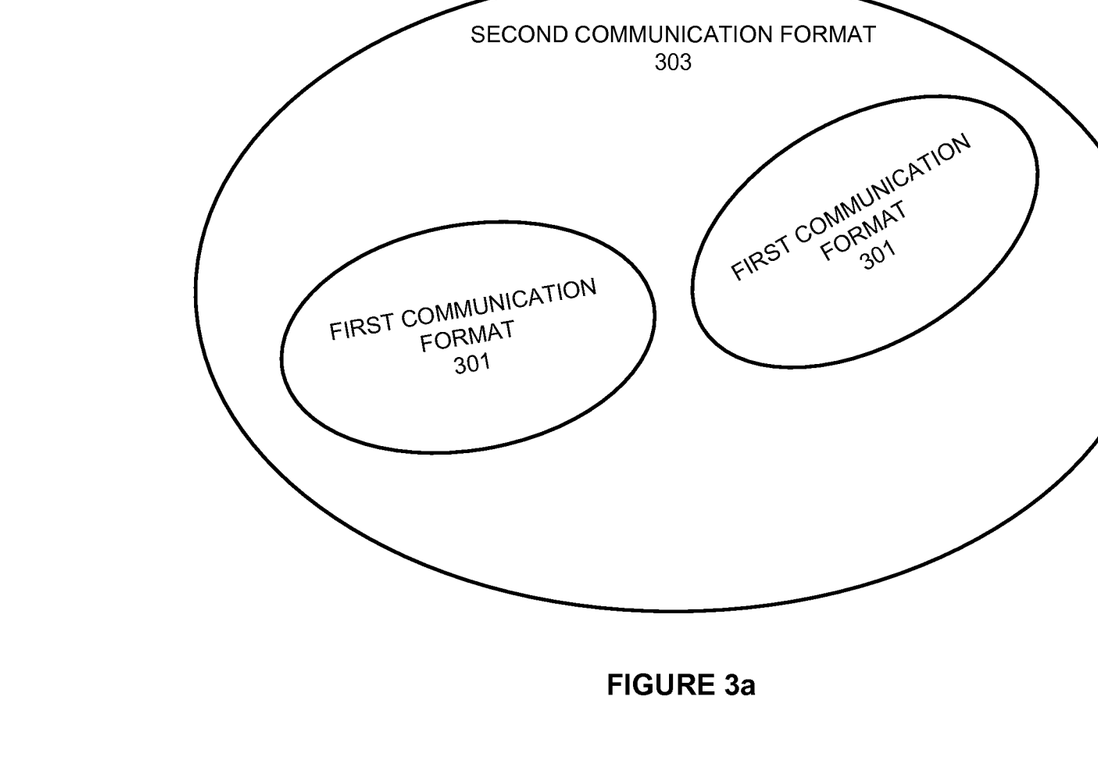
FIG. 3a illustrates a wireless communication system overview.
Figure 3B:
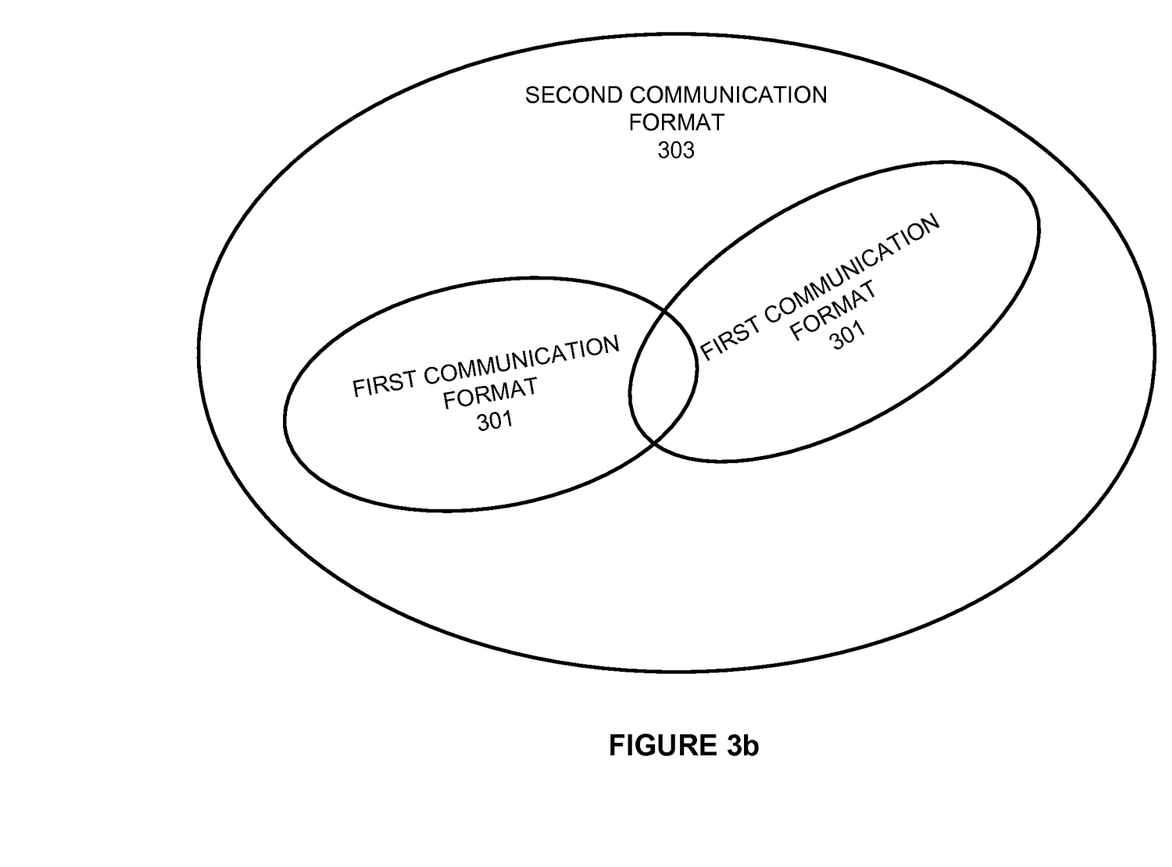
FIG. 3b illustrates a wireless communication system overview.

FIG. 3a and FIG. 3b illustrates a wireless communication system overview based on the method described in FIG. 2. Wireless communication system overview includes first communication format 301 and second communication format 303. In operation, a wireless communication system will begin with a communication format coverage similar to that depicted in FIG. 3a and will continue in that coverage for steps 201-203. FIG. 3a illustrates a situation where two first communication format zones are close, but do not intersect. During steps 201-203, the method will identify a wireless communication device with first communication format to second communication format switching capability, allocate a center bandwidth in the first communication format for the wireless communication device, and identify a handover event from the wireless communication device requesting a switch from the first communication format to the second communication format.

In response the handover event, the reference signal power will increase for at least the center bandwidth of the first communication format resulting in a first communication coverage area similar to that depicted in FIG. 3b. FIG. 3b illustrates, that as a result of the increase in reference signal power, the first communication format zones will intersect. In some examples, the increase may only occur for the center bandwidth of first communication format 101 and the outer bandwidth may either decrease in coverage or remain the same.

Figure 4:
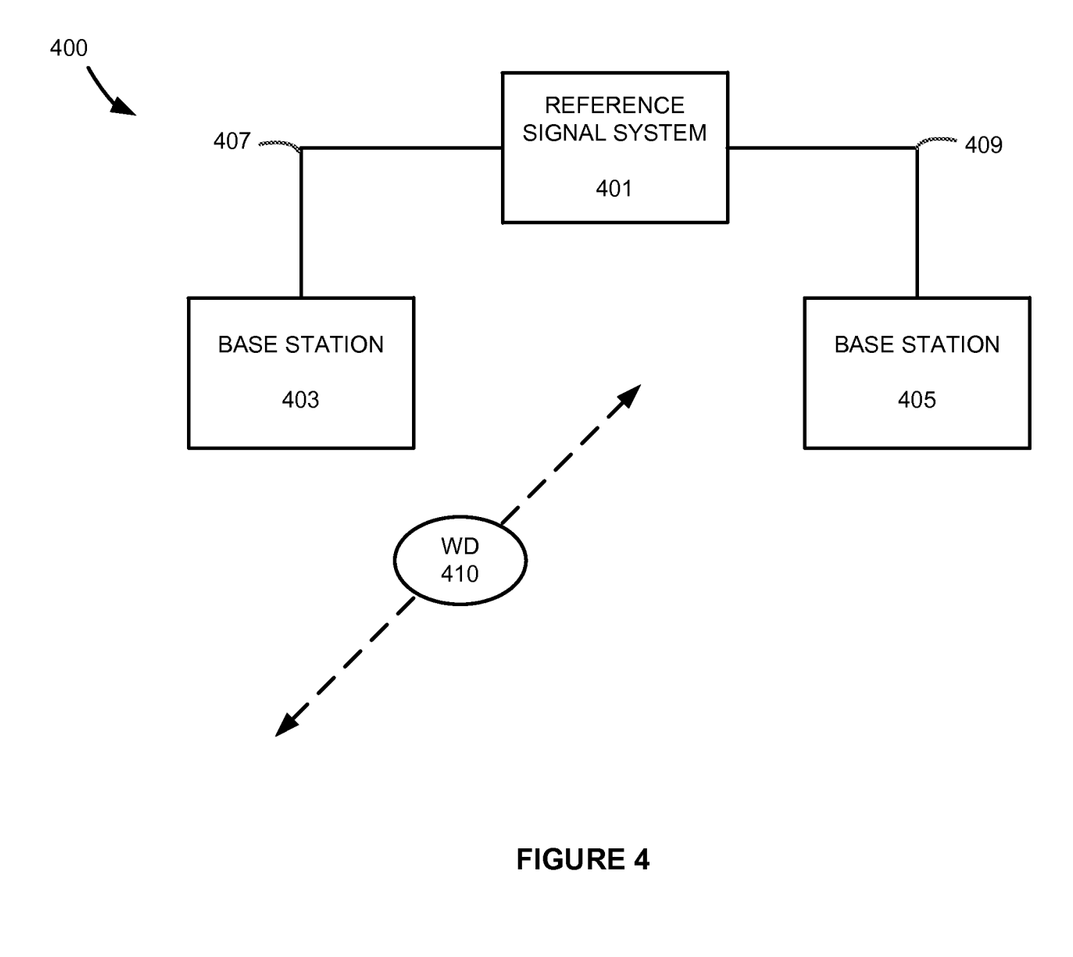
FIG. 4 illustrates a wireless communication system.

FIG. 4 illustrates a wireless communication system 400. Wireless communication system 400 includes reference signal system 401, base stations 403 and 405, communication links 407 and 409, and wireless communication device 410. Wireless communication device 410 will communicate with base stations 403 and 405 using a wireless communication format. Base stations 403 and 405 will communicate with reference signal system 401 using communication links 407 and 409, respectively.

Base stations 401 and 403 are used to provide wireless communications to wireless devices. In the present example, base stations 401 and 403 are used to provide wireless communication devices with a first communication format. The first communication format may include CDMA, EVDO, WIMAX, GSM, LTE, WIFI, HSPA, or some other wireless communication format. In some examples, outside the coverage area of base stations 401 and 403 is a second communication format, which is slower than the first communication format. In a specific example, the first communication format comprises LTE format and the second communication format comprises EVDO format. In some examples, base stations 401 and 403 comprise eNodeBs if the first communication format is an LTE network.

Wireless communication device 410 comprises Radio Frequency (RF) communication circuitry and an antenna. The RF communication circuitry typically includes an amplifier, filter, modulator, and signal processing circuitry. Wireless communication device 410 may also include a user interface, memory device, software, processing circuitry, or some other communication components. Wireless communication device 410 may be a telephone, computer, e-book, mobile Internet appliance, wireless network interface card, media player, game console, or some other wireless communication apparatus—including combinations thereof. In the present example, wireless communication device 410 includes first communication format to second communication format switching capability.

Reference signal system 401 includes one or more computer systems, custom hardware, or other devices capable controlling the reference signal power of a first communication format. In some examples, reference signal system 401 includes one or more desktop computers, server computers, or other similar computing devices.

Connecting reference signal system 401 to base stations 403 and 405 are communication links 407 and 409, respectively. Communication links 407 and 409 use metal, glass, air, space, or some other material as the transport media. Communication links 407 and 409 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 407 and 409 could be direct links or may include intermediate networks, systems, or devices.

In operation, reference signal system 401 will identify wireless communication device 410 as having a first wireless communication format to a second wireless communication format switching capability. In some examples, this identification can come when wireless communication device 410 comes in range of either base station 403 or base station 405, or may come when wireless device 410 initiates a data communication in the coverage area of base station 403 or base station 405. Following the identification of wireless communication device 410, reference signal system 401 will allocate a center bandwidth in the first communication format for wireless communication device 410. In some examples, the center bandwidth may include the center three megahertz in a five or ten megahertz band. Wireless communication device 410 may then transmit a handover event indicating a switch from the first communication format to the second communication format. In some examples, the handover event could occur when wireless communication device 410 reaches the edge of the coverage area of base station 403 or base station 405. In response to the handover event, reference signal system 401 may then increase the reference signal strength for at least the center bandwidth at base station 403 and/or base station 405.

Although illustrated separately in the present example, it should be understood that reference signal system 401 may be implemented wholly or partially on base station 403 and/or base station 405. Alternatively, each base station may include a separate reference signal system.

Figure 5A:
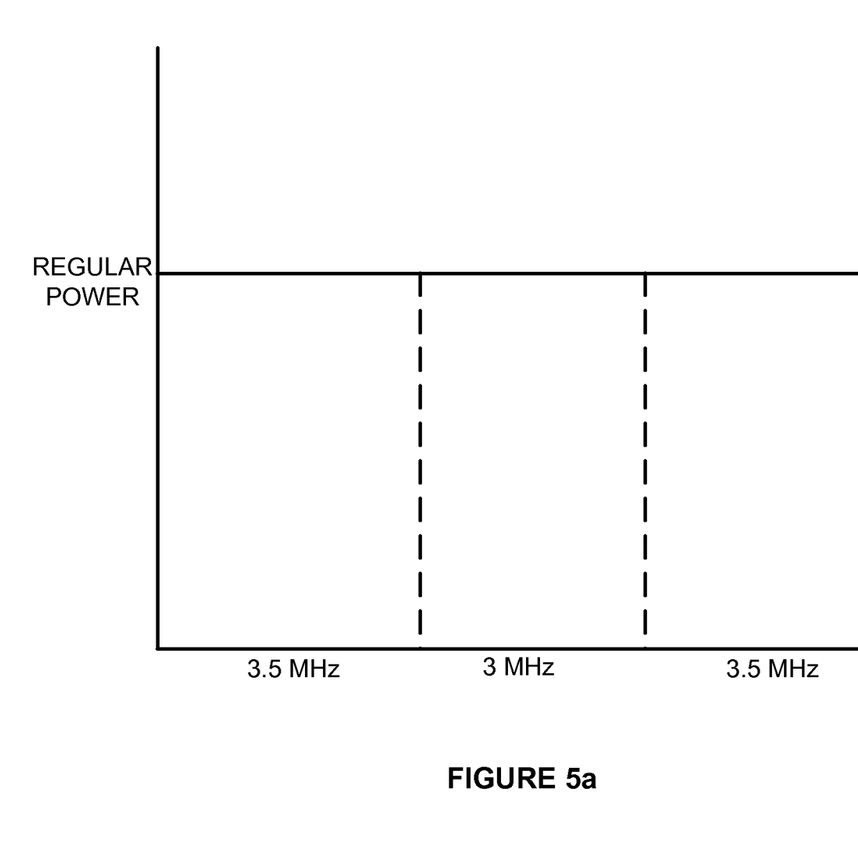
FIG. 5a illustrates a reference signal power graph of a communication system.
Figure 5B:
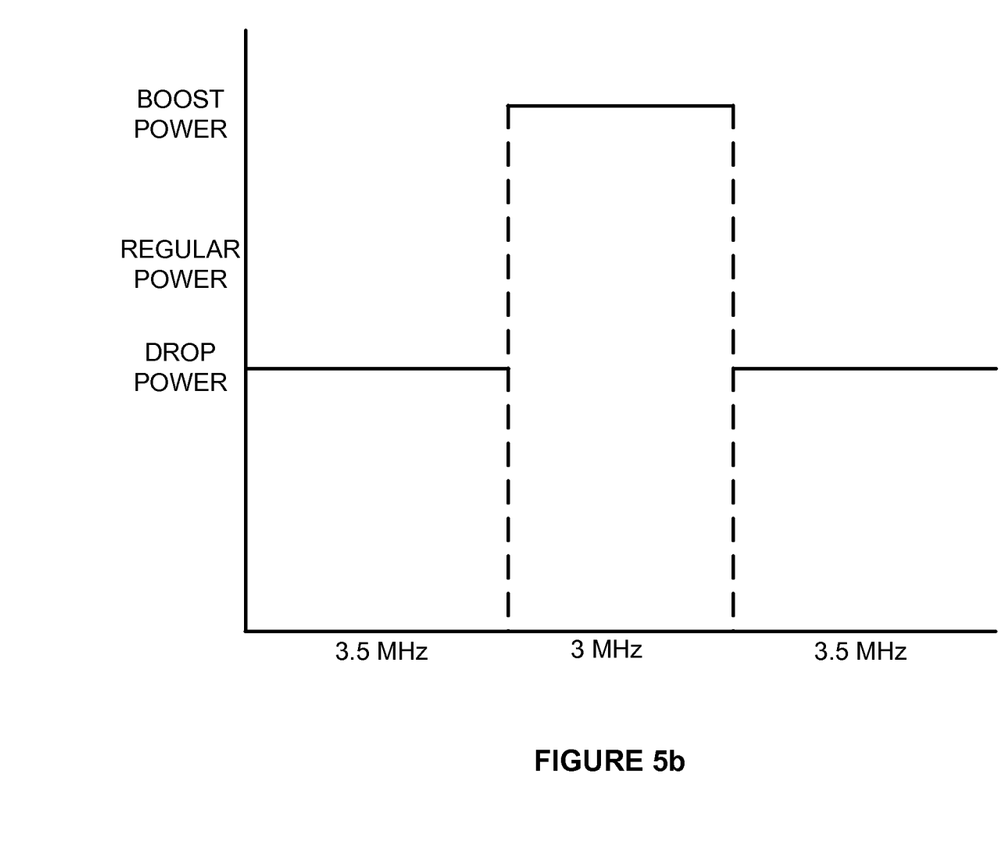
FIG. 5b illustrates a reference signal power graph of a communication system.

FIG. 5*a* and FIG. 5*b* illustrate a reference signal power graph of a communication system. The reference signal power graphs in FIG. 5*a* and FIG. 5*b* illustrate the reference signal power in a communication system during the operation described in FIG. 2. FIG. 5*a* and FIG. 5*b* include an x axis, which describes a bandwidth frequency in megahertz, and a y axis, which describes the reference signal power for the first communication format. The first communication format can be any first communication format described in FIG. 1.

FIG. 5*a* illustrates the reference signal power during operations 201-203 of FIG. 2. During these operations, the wireless communication system is configured to identify a wireless device with first communication format to second communication format switching capability, allocate a center bandwidth in the first communication format for the wireless device, and identify a handover event from the device indicating a switch from the first communication format to the second communication format.

In response to the handover event, the wireless communication system is configured increase the reference signal power for the first communication format in at least the center bandwidth. As illustrated in FIG. 5*b*, the reference signal in the center three megahertz increases to boost power, whereas the rest of the ten megahertz bandwidth drops to drop power. In some examples the remaining outer bandwidth will stay at regular power rather than dropping to drop power.

In some examples, a single first communication format base station may increase the reference signal power. In other examples, multiple first communication format base stations may increase the reference signal power.

Figure 6:
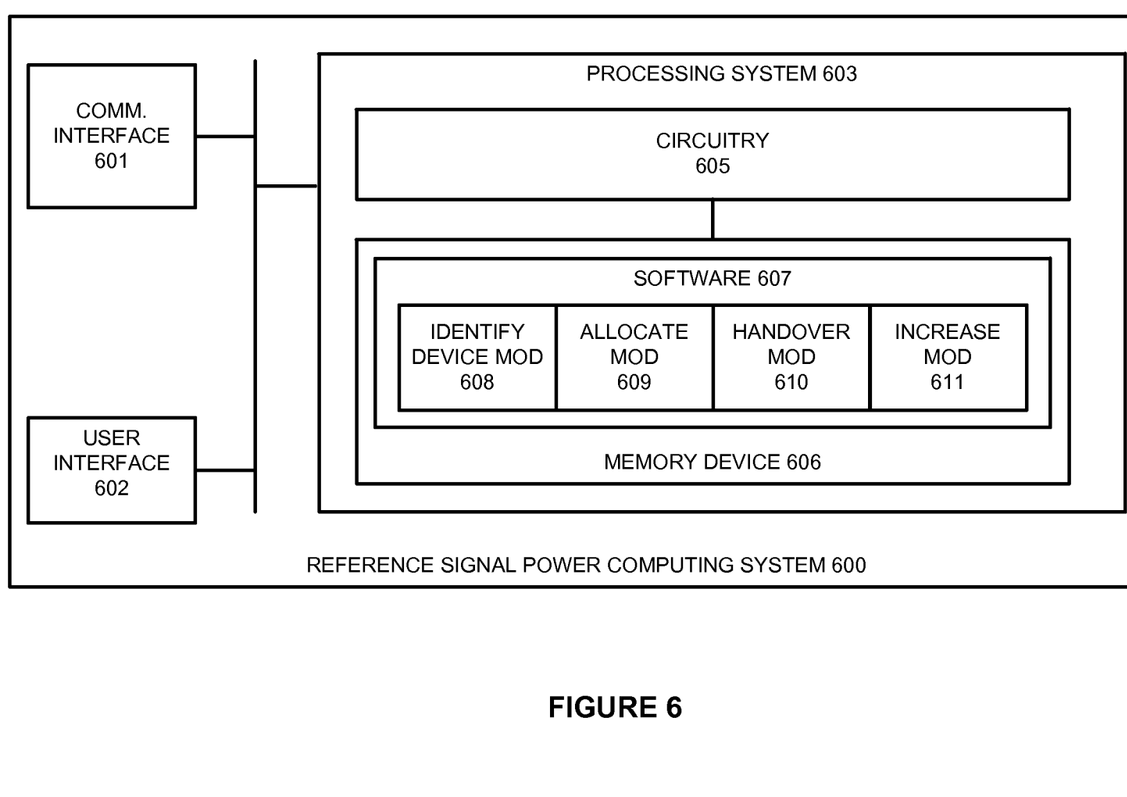
FIG. 6 illustrates a reference signal power computing system.

FIG. 6 illustrates a reference signal power computing system 600. Reference signal power computing system 600 is an example of reference signal system 401, although reference signal system 401 may use alternative configurations. Reference signal power computing system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof. Communication interface may be configured to communicate with one or more base stations in some examples.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes identify device module 608, allocate module 609, handover module 610, and increase module 611. Operating software 607 may further include an operating system, utilities, drivers, network interfaces, applications, or some other type of software. When executed by circuitry 605, operating software 607 directs processing system 603 to operate reference signal power computing system 600 as described herein.

In particular, identify device module 608 directs processing system 603 to identify a wireless device with first communication format to second communication format switching capability, allocate module 609 allocates a center bandwidth in the first communication format for the wireless device, handover module 610 identifies a handover event from the wireless device indicating a switch from the first communication format to the second communication format, and increase module 611 increases the reference signal power for at least the center bandwidth in the first communication format.

Although illustrated with four software modules in the present example, it should be understood that reference signal power computing system 600 may be implemented using one or more software modules. Furthermore, although reference signal power computing system 600 is illustrated as a single device for simplicity, it should be understood that reference signal power computing system 600 may be implemented on one or more computing devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, the method comprising:
   identifying a wireless communication device with first communication format to second communication format switching capability;
   allocating a center bandwidth in the first communication format for the wireless communication device;
   identifying a handover event from the wireless communication device requesting a switch from the first communication format to the second communication format; and
   in response to the handover event, increasing reference signal power for at least the center bandwidth in the first communication format to prevent the switch from the first communication format to the second communication format.

2. The method of claim 1 wherein the first communication format is a faster communication format than the second communication format.

3. The method of claim 1 wherein the first communication format comprises LTE communication format.

4. The method of claim 3 wherein the second communication format comprises EVDO communication format.

5. The method of claim 1 wherein the center bandwidth comprises a center 3 MHz bandwidth.

6. The method of claim 1 wherein the handover event occurs as the wireless communication device approaches a first communication format boundary.

7. The method of claim 1 further comprising:
   in response to the handover event, decreasing the reference signal power for first communication format bandwidth that is not in the center bandwidth.

8. A non-transitory computer readable medium having program instruction stored thereon that, when executed by a reference signal power computing system, direct the reference signal power computing system to at least:
   identify a wireless communication device with first communication format to second communication format switching capability;
   allocate a center bandwidth in the first communication format for the wireless communication device;
   identify a handover event from the wireless communication device requesting a switch from the first communication format to the second communication format; and
   in response to the handover event, increase reference signal power for at least the center bandwidth in the first communication format to prevent the switch from the first communication format to the second communication format.

9. The non-transitory computer readable medium of claim 8 wherein the first communication format is a faster communication format than the second communication format.

10. The non-transitory computer readable medium of claim 8 wherein the first communication format comprises LTE communication format.

11. The non-transitory computer readable medium of claim 10 wherein the second communication format comprises EVDO communication format.

12. The non-transitory computer readable medium of claim 8 wherein the center bandwidth comprises a center 3 MHz bandwidth.

13. The non-transitory computer readable medium of claim 8 wherein the handover event occurs as the wireless communication device approaches a first communication format boundary.

14. The non-transitory computer readable medium of claim 8 wherein the program instructions further direct the reference signal power computing system to, in response to the handover event, decrease the reference signal power for first communication format bandwidth that is not in the center bandwidth.

15. A wireless communication system comprising at least:
   a wireless communication device configured with first communication format to second communication format switching capability;
   two or more wireless base stations configured to communicate with the wireless communication device in the first communication format; and
   a reference signal system configured to:
      identify the wireless communication device;
      allocate a center bandwidth in the first communication format for the wireless communication device;
      identify a handover event from the wireless communication device requesting a switch from the first communication format to the second communication format; and
      in response to the handover event, increase reference signal power for at least the center bandwidth in the first communication format to prevent the switch from the first communication format to the second communication format.

16. The wireless communication system of claim 15 wherein the first communication format is a faster communication format than the second communication format.

17. The wireless communication system of claim 15 wherein the first communication format comprises LTE communication format.

18. The wireless communication system of claim 17 wherein second communication format comprises EVDO communication format.

19. The wireless communication system of claim 15 wherein the center bandwidth comprises a center 3 MHz bandwidth.

20. The wireless communication system of claim 15 wherein the handover event occurs as the wireless communication device approaches a first communication format boundary.

* * * * *